(12) United States Patent
Priester et al.

(10) Patent No.: US 7,954,629 B2
(45) Date of Patent: Jun. 7, 2011

(54) METHOD AND DEVICE FOR TRANSFERRING A TRANSPORTING HANGER FOR GARMENTS TO A FOLLOWING CONVEYOR

(75) Inventors: Uwe Priester, Vlotho (DE); Engelbert Heinz, Vlotho (DE); Jürgen Möcker, Herford (DE)

(73) Assignee: Herbert Kannegiesser GmbH (DE)

( * ) Notice: Subject to any disclaimer, the term of this patent is extended or adjusted under 35 U.S.C. 154(b) by 753 days.

(21) Appl. No.: 11/869,242

(22) Filed: Oct. 9, 2007

(65) Prior Publication Data
US 2008/0251355 A1   Oct. 16, 2008

(30) Foreign Application Priority Data

Oct. 10, 2006   (DE) .......................... 10 2006 048 142

(51) Int. Cl.
*B65G 47/61*   (2006.01)
*B65G 17/20*   (2006.01)

(52) U.S. Cl. ...................... 198/670; 198/678.1; 198/617

(58) Field of Classification Search ............. 198/370.01, 198/469.1, 478.1, 678.1, 680, 685, 617
See application file for complete search history.

(56) References Cited

U.S. PATENT DOCUMENTS

| | | | | |
|---|---|---|---|---|
| 3,710,711 A | * | 1/1973 | Boehm et al. | 100/7 |
| 3,807,314 A | * | 4/1974 | Slemmons | 198/370.13 |
| 4,903,819 A | * | 2/1990 | Heinold et al. | 198/465.4 |
| 5,076,417 A | * | 12/1991 | Santicchi | 198/465.4 |
| 5,125,513 A | * | 6/1992 | Branch | 209/3.3 |
| 5,193,686 A | * | 3/1993 | Speckhart et al. | 209/3.3 |
| 5,467,863 A | | 11/1995 | Hirao | |

FOREIGN PATENT DOCUMENTS

DE   39 35 487 A1   5/1991
DE   202 17 423 U1   2/2003

OTHER PUBLICATIONS

EP Search Report.

* cited by examiner

*Primary Examiner* — Douglas A Hess
(74) *Attorney, Agent, or Firm* — Laurence P. Colton; Smith Risley Tempel Santos LLC

(57) ABSTRACT

A star-shaped intermediate conveyor (13) between the feed conveyor (11) and the delivery conveyor (12). The intermediate conveyor (13) has a plurality of radial arms (26), which are fastened to a central part (28) of the intermediate conveyor (13). The radially outwardly pointing arms (26) are rotatable about an axis of rotation (29) of the intermediate conveyor (13). In this way it is possible with any given orientation of the transporting hanger for an arm (26) to be brought under the hanger hook (16) of the transporting hanger. This ensures reliable transfer of a transporting hanger from the feed conveyor (11) to the delivery conveyor (12) under any circumstances in a simple way.

15 Claims, 8 Drawing Sheets

METHOD AND DEVICE FOR TRANSFERRING A TRANSPORTING HANGER FOR GARMENTS TO A FOLLOWING CONVEYOR

STATEMENT OF RELATED APPLICATIONS

This patent application claims convention priority on German Patent Application No. 10 2006 048 142.9 having a filing date of 10 Oct. 2007, which is incorporated herein by this reference.

BACKGROUND OF THE INVENTION

1. Technical Field

The invention relates to a method for transferring a transporting hanger for garments from a feed conveyor to a following conveyor, in particular a delivery conveyor, the transporting hanger that is hanging with a hanger hook on the feed conveyor being released from the feed conveyor and, for further transport, the transporting hanger being hung onto the following conveyor. The invention also relates to a device for transferring a transporting hanger for garments from a feed conveyor to a following conveyor, in particular a delivery conveyor.

2. Related Art

In textile processing establishments, in particular laundries, transporting hangers are used for transporting garments through the establishment. The transporting hangers may be ones that are used for hanging shirts, coats, jackets, overalls or the like or ones that are used for hanging or securing pants and other garments.

During transport through the establishment, both the transporting hangers bearing a garment and empty transporting hangers must be transferred from one conveyor to another. These may be conveyors of any given type, and in particular also of different types, for example ones with a circulating conveying chain for driven further transport of the transporting hangers. In the transfer of the transporting hangers from one conveyor to the other, it has been found to be problematic if the transporting hangers have to be transferred from the feed conveyor to the following conveyor with differing orientation. The problems arising as a result are solved in practice in various ways. However, these solutions are always complicated and do not always lead to adequately reliable transfer of the transporting hanger from one conveyor to the other.

BRIEF SUMMARY OF THE INVENTION

The invention is based on the object of providing a method and a device for transferring a transporting hanger for garments to a following conveyor, whereby a reliable transfer of transporting hangers of any given orientation to the following conveyor is possible in a simple way.

A method for achieving this object is a method for transferring a transporting hanger for garments from a feed conveyor to a following conveyor, in particular a delivery conveyor, the transporting hanger that is hanging with a hanger hook on the feed conveyor being released from the feed conveyor and, for further transport, the transporting hanger being hung onto the following conveyor, wherein, when the transporting hanger is released from the feed conveyor, the hook of said hanger is caught by an intermediate conveyor, having at least one short intermediate conveying section, and it is transferred by at least one intermediate conveyor to the following conveyor. It is accordingly provided that, when the transporting hanger is released from the feed conveyor, the hook of said hanger is caught by an intermediate conveyor, having at least one short intermediate conveying section, and it is transported by the intermediate conveyor to the following conveyor. The intermediate conveying section eliminates the rigid assignment between the feed conveyor and the following conveyor, in particular a delivery conveyor, as a result of which transporting hangers can also be reliably transferred to the following conveyor with stems of the hanger hooks out in front, in that the intermediate conveying section, which is configured with preference in a movable manner, is brought into a position for attaching the hanger hook in time for the release of the transporting hanger from the feed conveyor even if the stem is out in front, after which the transporting hanger is further transported with its hanger hook by the intermediate conveying section to the following conveyor.

It is provided with preference that, before the release from the feed conveyor, the at least one intermediate conveying section is moved by the transporting hanger, in particular its hanger hook, into a position for catching preferably the hanger hook. If, accordingly, the transporting hanger comes into contact with the intermediate conveying section with the stem of the hanger hook out in front, the further-transported transporting hanger causes the intermediate conveying section likewise to be moved further, whereby at least the next-following intermediate conveying section inserts itself under the loop of the hanger hook bent in a semicircular or U-shaped manner, and so passes through the plane of the hanger hook. When the transporting hanger is subsequently released from the feed conveyor, the transporting hanger is caught as it were at the hanger hook by at least one intermediate conveying section.

According to a preferred refinement of the method, it is provided that the respective intermediate conveying section is moved into the position for catching preferably the hanger hook by pivoting about one end. The pivoting of the respective intermediate conveying section makes it possible to insert the preferably perpendicular stem of the hanger hook of the respective transporting hanger between two successive intermediate conveying sections. While one intermediate conveying section lying against the perpendicular stem of the hanger hook is moved further, the then following intermediate conveying section is moved synchronously with it to the rear side of the stem, under the arcuately formed hanger hook. As a result, an intermediate conveying section ends up under the accurately formed upper part of the hanger hook in any event, irrespective of whether the latter is transferred with the stem out in front or the stem trailing behind, as seen in the conveying direction.

With preference, the further movement of the end of each intermediate conveying section takes place transversely in relation to the longitudinal axis of the respective intermediate conveying section about an axis of rotation. As a result, the intermediate conveying sections are pivoted or turned like arms of a turnstile, whereby a stem of a hanger hook respectively ends up between two successive rod-shaped intermediate conveying sections. This leads to an isolated transfer of one transporting hanger in each case to an intermediate conveying section of the intermediate conveyor. It is in this case of no significance at all for the reliability of the transfer whether the stem of the hanger hook is out in front or trailing behind in the transporting direction.

In the case of a preferred refinement of the method, the free ends of the intermediate conveying sections remote from the central axis of rotation move during the pivoting on a circular path about the axis of rotation. This circular path is intersected by the conveying section of the feed conveyor, the transporting hanger being released from the feed conveyor onto at least one intermediate conveying section of the turnstile-like intermediate conveyor after the conveying section of the feed conveyor enters the circular path of the free end of the intermediate conveying section and is caught by it. Because the turnstile with the intermediate conveyors is moved further by the out-in-front stem of a hanger hook while the further transport is still being performed by the feed conveyor, the stem of the transporting hanger pushes itself into the space between two successive rod-like intermediate conveying sections, whereby the hanger hook of the respective transporting hanger to be released enters the region of the circular path about the free ends of all the intermediate conveying sections and, when it is released from the feed conveyor, the hanger hook always falls onto an intermediate conveying section, to be precise either an intermediate conveying section lying ahead of the stem of the hanger hook (stem trailing behind) or a following intermediate conveying section (stem out in front).

According to a preferred refinement of the method, each elongate, preferably rod-like, intermediate conveying section slopes down toward the free end. As a result, the hanger hook of the transporting hanger released onto the intermediate conveying section can slide off from the intermediate conveying section and in this way pass along the intermediate conveying section over the free end of the same into the region of the following conveyor, in particular the delivery conveyor. For this purpose, it is provided according to a further refinement of the invention that the intermediate conveying section respectively serving for transferring the transporting hanger to the following conveyor is arranged in front of the conveying section of the delivery conveyor during the transfer. In this way, the respective intermediate conveyor momentarily acts as an extension of the conveying section of the delivery conveyor for the purpose of the transfer of the transporting hanger to the same.

In the case of a preferred development of the method, the transporting hanger is transferred to the delivery conveyor in approximately the same position in which the intermediate conveying section takes over the transporting hanger from the feed conveyor. In this way it is possible to carry out the taking over of the transporting hanger by the intermediate conveyor and the passing on of the transporting hanger from the intermediate conveying section taking over the transporting hanger to the conveying section of the delivery conveyor with the intermediate conveyor at a standstill, in a position of the intermediate conveyor in which an intermediate conveying section of the same acts as an extension of the conveying section of the delivery conveyor, whereby the intermediate conveying section onto which the transporting hanger passes when it is released by the feed conveyor remains in an unchanging relative position with respect to the then following conveyor, in particular the delivery conveyor. It is therefore possible for the transporting hanger to slide off from the intermediate conveying section, momentarily acting as an extension of the conveying section of the delivery conveyor, onto the following conveyor, in particular the delivery conveyor.

A device for achieving the object mentioned at the beginning is a device for transferring a transporting hanger for garments from a feed conveyor to a following conveyor, in particular a delivery conveyor, wherein an intermediate conveyor is arranged between the feed conveyor and the following conveyor and the intermediate conveyor has a number of intermediate conveying sections that can be moved at one and the same time. The fact that an intermediate conveyor is arranged between the feed conveyor and the following conveyor, in particular a delivery conveyor, and the intermediate conveyor has a number of intermediate conveying sections that can be moved at one and the same time allows the transporting hanger to be transferred to the following conveyor by means of an "appropriate" conveying section according to the orientation on the feed conveyor. In particular, the transporting hanger with the stem of the hanger hook out in front in the conveying direction of the feed conveyor can, by coming into contact with the front of an intermediate conveying section, bring at least the following intermediate conveying section into a position that is suitable for guiding the transporting hanger released from the feed conveyor by the hanger hook to the conveying section of the following conveyor.

The intermediate conveying sections of the intermediate conveyor are assigned to the conveying section of the feed conveyor in such a way that at least one intermediate conveying section for taking over the transporting hanger, in particular a hanger hook of the same, intersects the conveying section of the feed conveyor. As a result, the transporting hanger released from the feed conveyor passes with its hanger hook onto at least one intermediate conveying section, from which the transporting hanger can be reliably transferred to the conveying section of the following conveyor.

It is provided with preference, for the transfer of the transporting hanger from the intermediate conveyor to the delivery conveyor in particular, to extend the conveying section of the same by at least one intermediate conveying section. In this case, with preference an end region of the at least one intermediate conveying section serving for the transfer overlaps a beginning region of the conveying section of the following conveyor. As a result, a reliable transfer under any circumstances of a single or isolated transporting hanger to the conveying section of the following conveyor is ensured. In this case, the end region of the respective intermediate conveying section is preferably located over the beginning region of the conveying section of the following conveyor, whereby the transfer can take place under gravitational force, without the intermediate conveyor being driven, by the hanger hook sliding off.

It is further provided that the intermediate conveying sections are formed by elongate arms, which have a star-like or spider-like relative arrangement in relation to one another. The elongate arms may move through the plane of the hanger hook, whereby it is ensured with any given orientation of the transporting hanger on the feed conveyor that a transporting hanger released from the same passes with the hanger hook onto at least one intermediate conveying section formed as an elongate arm.

It is provided with preference that all the arms for forming the intermediate conveying sections are connected by one end at a center point of the intermediate conveyor. In this way, all the conveying sections or arms of the intermediate conveyor can be made to advance together on an equal basis. If, accordingly, one elongate arm is moved further by an out-in-front stem of a hanger hook, the other elongate arms follow this movement. As a result, at least one arm can end up under the hanger hook to form an intermediate conveying section, even with the stem of the hanger hook out in front.

The elongate arms of the intermediate conveyor forming the intermediate conveying sections extend radially outward from the center point of the same. With preference, the free ends of the arms, preferably formed in a rod-like manner, then lie on an imaginary circular path, which extends concentrically around the center point of the intermediate conveyor. As a result, the intermediate conveyor is formed in the manner of a turnstile, which has a preferably upright or slightly inclined axis of rotation lying at the center point, about which all the arms are simultaneously rotatable. The turnstile has a plurality of arms formed in the same manner. The number of arms may be 3 to 16. By turning the turnstile about the axis of rotation, all the arms that extend radially outward from the axis of rotation are pivoted simultaneously. In this case, some arms, preferably only one arm or else two or three arms, intersect(s) the conveying section of the feed conveyor, in that the stem of the hanger hook of the respective transporting hanger ends up between two successive arms. This ensures that, when the transporting hanger is released from the feed conveyor, the upper part of the hanger hook, bent around in a U-shaped manner, always passes onto an elongate rod-like arm with any given orientation of the transporting hanger on the feed conveyor.

It is further provided that all the arms extend in an inclined manner from the center point or the axis of rotation of the turnstile to the free outer ends. As a result, the arms slope down toward their free ends, whereby a hanger hook can slide off from the at least one arm on which it is hanging, for the transfer to the following conveyor, following gravitational force.

According to a further refinement of the device, the turnstile is freely rotatable about the axis of rotation. Accordingly, the turnstile does not need to have a drive of its own. The turnstile is turned and the arms of the same are thereby pivoted by the stem of the hanger hook during the further transport of the transporting hanger on the feed conveyor.

Further advantageous refinements of the method and of the device emerge from the subclaims.

BRIEF DESCRIPTION OF THE DRAWINGS

A preferred exemplary embodiment of the invention is explained in more detail below on the basis of the drawings, in which.

DETAILED DESCRIPTION OF PREFERRED EMBODIMENTS

Figure 1:
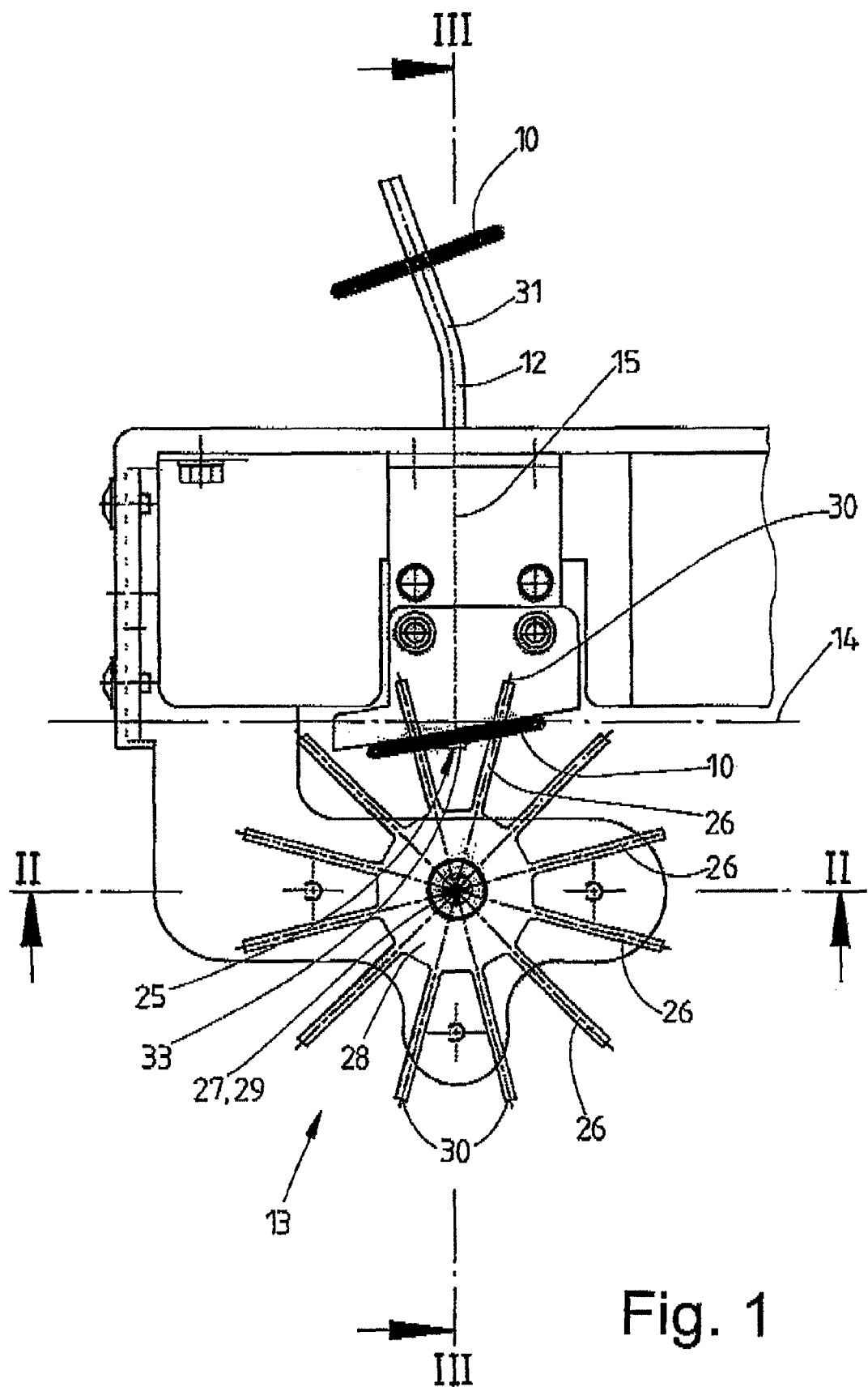
FIG. 1 shows a plan view of the device according to the invention.
Figure 2:
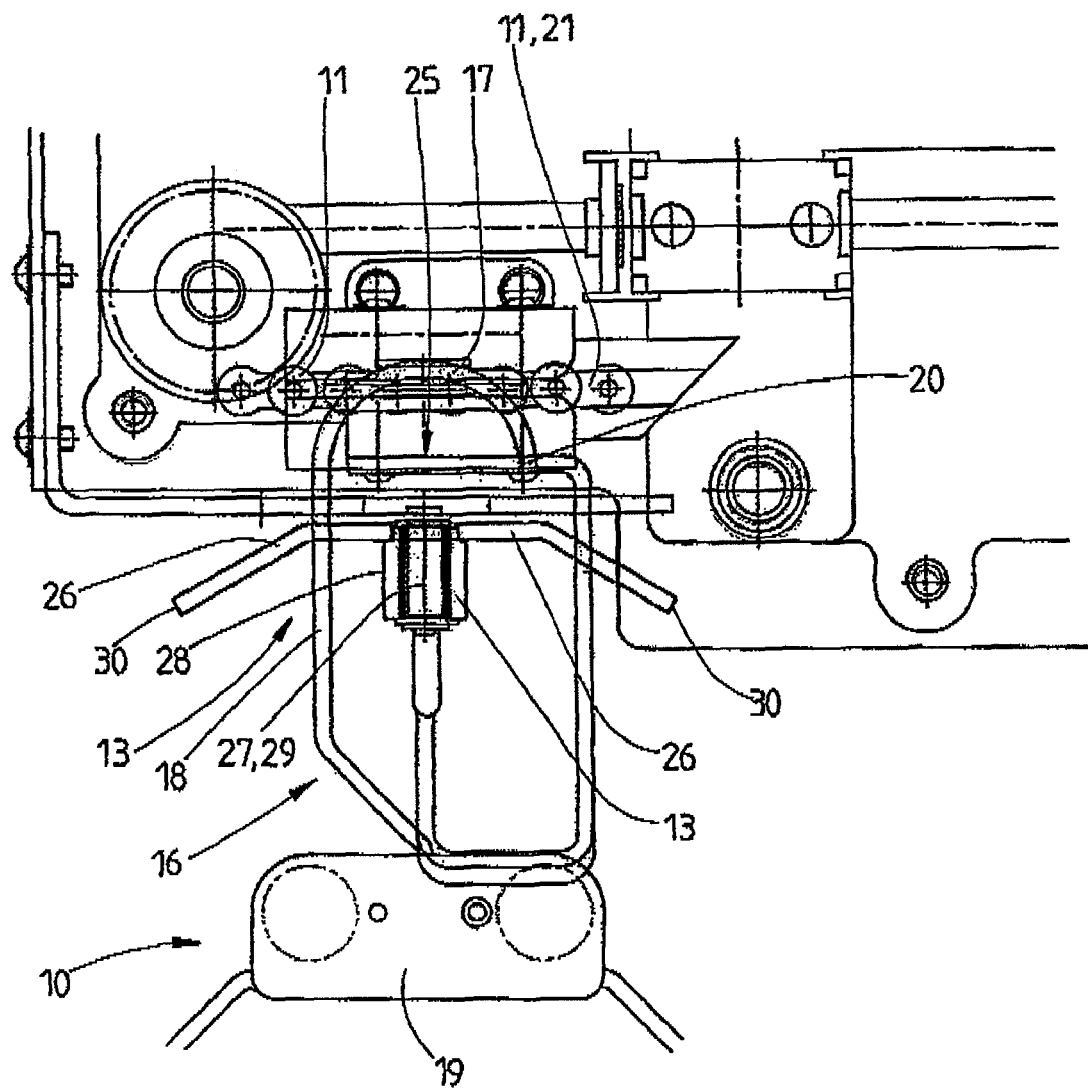
FIG. 2 shows a cross section II-II through the device of FIG. 1.
Figure 3:
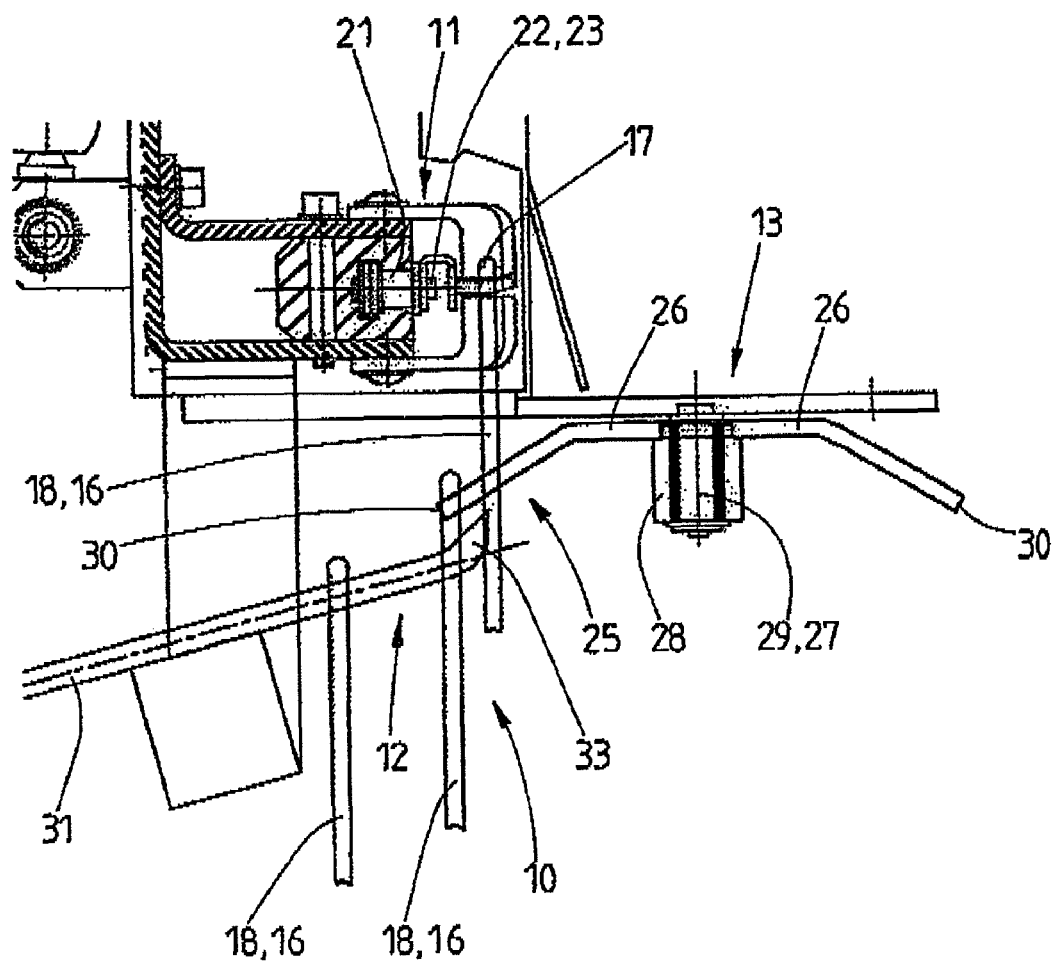
FIG. 3 shows a cross section III-III through the device of FIG. 1.

The invention is discussed on the basis of the example of the transfer of a transporting hanger 10 for garments (not shown), such as for example overalls, shirts, jackets or the like. The invention is concerned with the transfer of the transporting hanger 10 from a feed conveyor 11 to a following conveyor, in the exemplary embodiment shown a delivery conveyor 12. This transfer is supported by an intermediate conveyor 13, which bridges the conveying sections 14 and 15 of the feed conveyor 11 and the delivery conveyor 12. The intermediate conveyor 13 has a number of pivotable intermediate conveying sections. For the transfer of the transporting hanger 10 to the delivery conveyor 12, at least one intermediate conveying section inserts itself into the plane of a hanger hook 16 of the transporting hanger 10. The hanger hook 16 has an arcuately bent hook 17 and an approximately perpendicularly extending elongate stem 18. The stem 18 connects one end of the hook 17 to a lower part 19 of the transporting hanger 10, which serves for hanging the garment. The stem 18 is formed onto one end of the hook 17 in one piece, so that the hook 17 is continued at one end by the stem 18 to form the hanger hook 16. An end of the hook 17 remote from the stem 18 is formed as a free end 20, which lies laterally alongside and at a distance from the stem 18.

In the exemplary embodiment shown, the feed conveyor 11 has an endless conveying chain 21, which is driven in a circulating manner. Laterally projecting, horizontal pins 22 are arranged at equal intervals on the conveying chain 21. Each pin 22 has on its side facing away from the conveying chain 21 a free end 23. Respectively hung on the pin 22 is a transporting hanger 10 on the feed conveyor 11. The transporting hanger 10 hanging on the pin 22 is in this way moved further by the driven feed conveyor 11 along its conveying section 14. This conveying section 14 may follow any path.

The transporting hangers 10 may hang on the pin 22 of the feed conveyor 11 in differing orientation. Either the perpendicular stem 18 of the hanger hook 16 is out in front or trailing behind in the conveying direction 14. In the case of the out-in-front stem 18, it is located in front of the pin 22, as seen in the conveying direction 24. A trailing stem 18 is located behind the pin 22, as seen in the conveying direction 24.

At a transfer point 25, the intermediate conveyor 13 is arranged with, according to the invention, a number of pivotable or rotatable intermediate conveying sections. In the exemplary embodiment shown, all the intermediate conveying sections are formed in the same manner, that is to say in each case formed by an elongate, rod-like arm 26. Each arm 26 in this way forms an intermediate conveying section. All the arms 26 are arranged in a star-like or spider-like manner in relation to one another, in that they extend radially outward from a center point 27 of the intermediate conveyor 13. All the arms 26 are firmly connected at their inner ends, pointing toward the center point 27, to a central part 28 of the intermediate conveyor 13. The star-shaped or spider-shaped arrangement of the arms 26 gives the intermediate conveyor 13 the form of a turnstile. The turnstile can be turned about an axis of rotation 29 extending through the center point 27. The axis of rotation 29 extends approximately vertically in the exemplary embodiment shown. The turnstile of the intermediate conveyor 23 is not driven about the axis of rotation 29; rather, it is freely rotatable about the axis of rotation 29. The turnstile-like intermediate conveyor 13 shown has twelve identically formed arms 26. The twelve arms 26 are spaced apart from one another by the same angles, so that, with twelve arms 26, the angle between two respectively adjacent arms 26 is 30°. However, it is also conceivable for the intermediate conveyor 13 to have a greater or lesser number of arms 26. It may have an even or odd number of arms 26.

Outer free ends of all the arms 26, directed away from the center point 27, lie on a common, imaginary circular path, which extends concentrically with respect to the center point 27 or with respect to the axis of rotation 29 of the turnstile-like intermediate conveyor 13. All the identically formed arms 26 are formed as thin, elongate rods or tubes. The arms 26 are connected to the central part 28, lying at the center point 27 or on the axis of rotation 29, in such a way that the free ends 30 of all the arms 26 lie under the central part 28. As a result, all the arms 26 run down toward their free ends 30, so that the arms 26 form downward-sloping intermediate conveying sections on which the respective transporting hanger 10 can slide with the hook 17 toward the free end 30. On account of the free ends 30 of the arms 26 lying lower than the center point 27, the turnstile forming the intermediate conveyor 13 has an umbrella-like shape.

The intermediate conveyor 13, formed as a turnstile, is adjoined by the delivery conveyor 12. The delivery conveyor 12 shown is formed as a gravity conveyor. For this purpose, the conveying section 15 of the delivery conveyor 12 is formed by a rail 31 with a path directed downward in the conveying direction 32 of the delivery conveyor 12. The rail 31 is formed in the simplest case as a rod or a tube. The rail 31 may follow any path in the conveying direction 32 of the delivery conveyor 12. Depending on the configuration of the rail 31, the delivery conveyor 12 can in this way have any conveying sections 15.

The free end 33 of the rail 31 pointing toward the turnstile-like intermediate conveyor 13 protrudes with an end region into the imaginary circle about the free ends 30 of the arms 26. An end region extending from the free end 33 of the rail 31 overlaps the end region of an arm 26 or two adjacent arms 26 in the vicinity of the rail 31. The end region of the same extending from the free end 33 of the rail 31 is also arranged somewhat below the plane in which the arms 26 lie. This allows the arms 26 to run past the end region of the rail 31 of the delivery conveyor 12 that overlaps said arms. The described relative arrangement of the delivery conveyor 12 with respect to the turnstile-like intermediate conveyor 13 has the effect that an arm 26 or two adjacent arms 26 form(s) an extension of the delivery conveyor 12 in the direction of the center point 27 of the turnstile-like intermediate conveyor 13.

Figure 4:
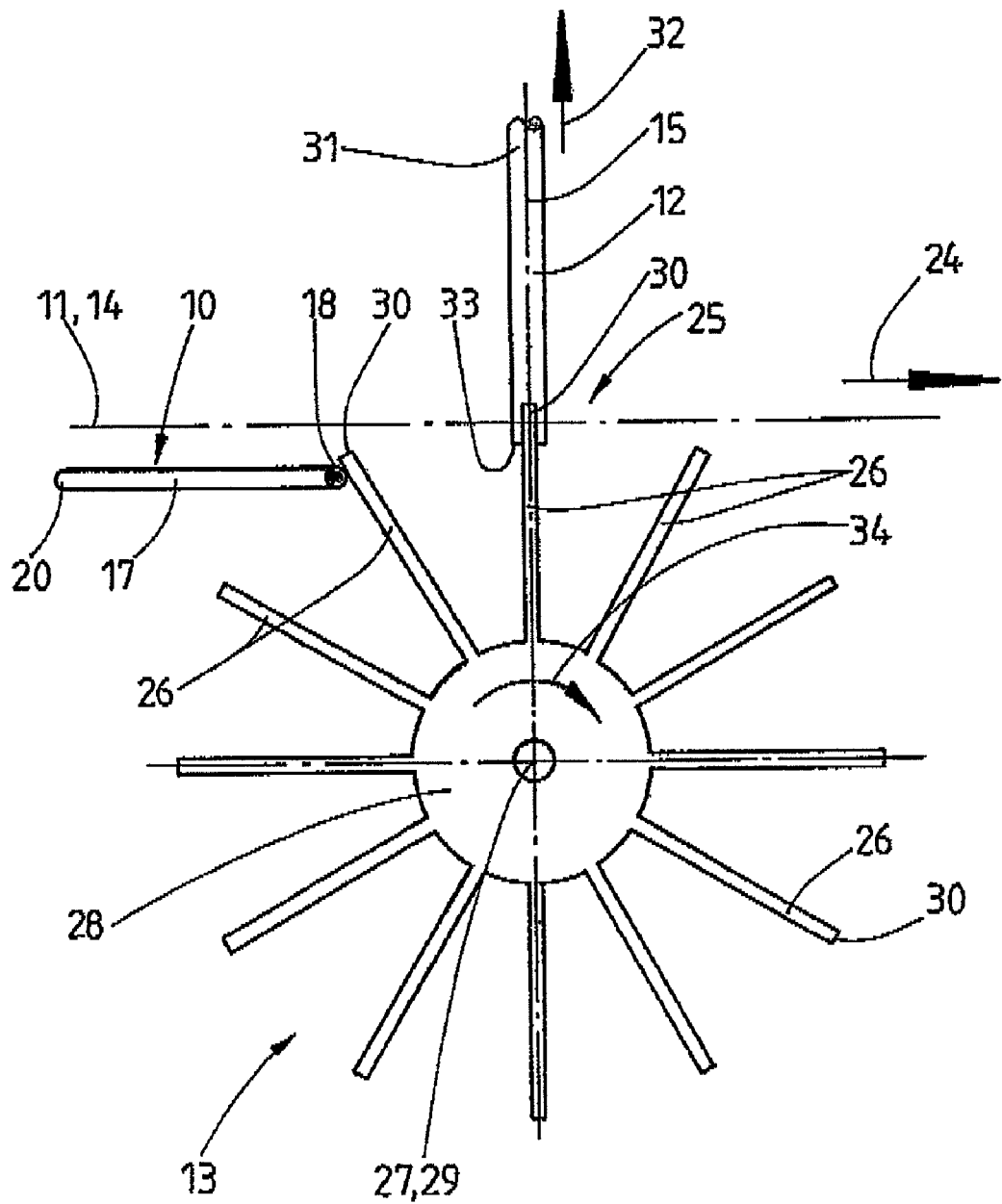
FIG. 4 shows a schematic plan view of the device for transferring a transporting hanger with the stem of the hanger hook out in front.
Figure 5:
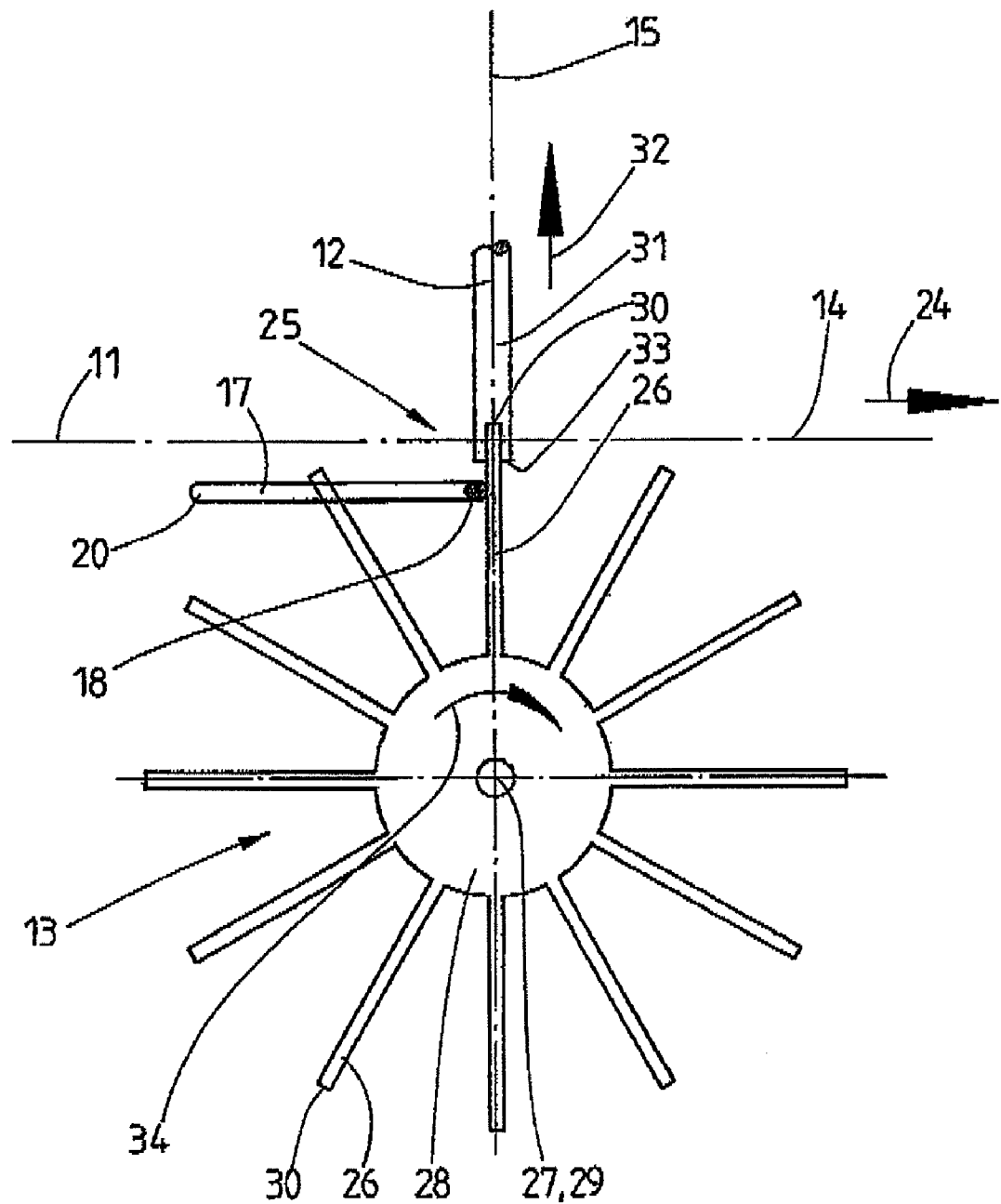
FIG. 5 shows a plan view analogous to FIG. 4 with the transporting hanger moved further.
Figure 6:
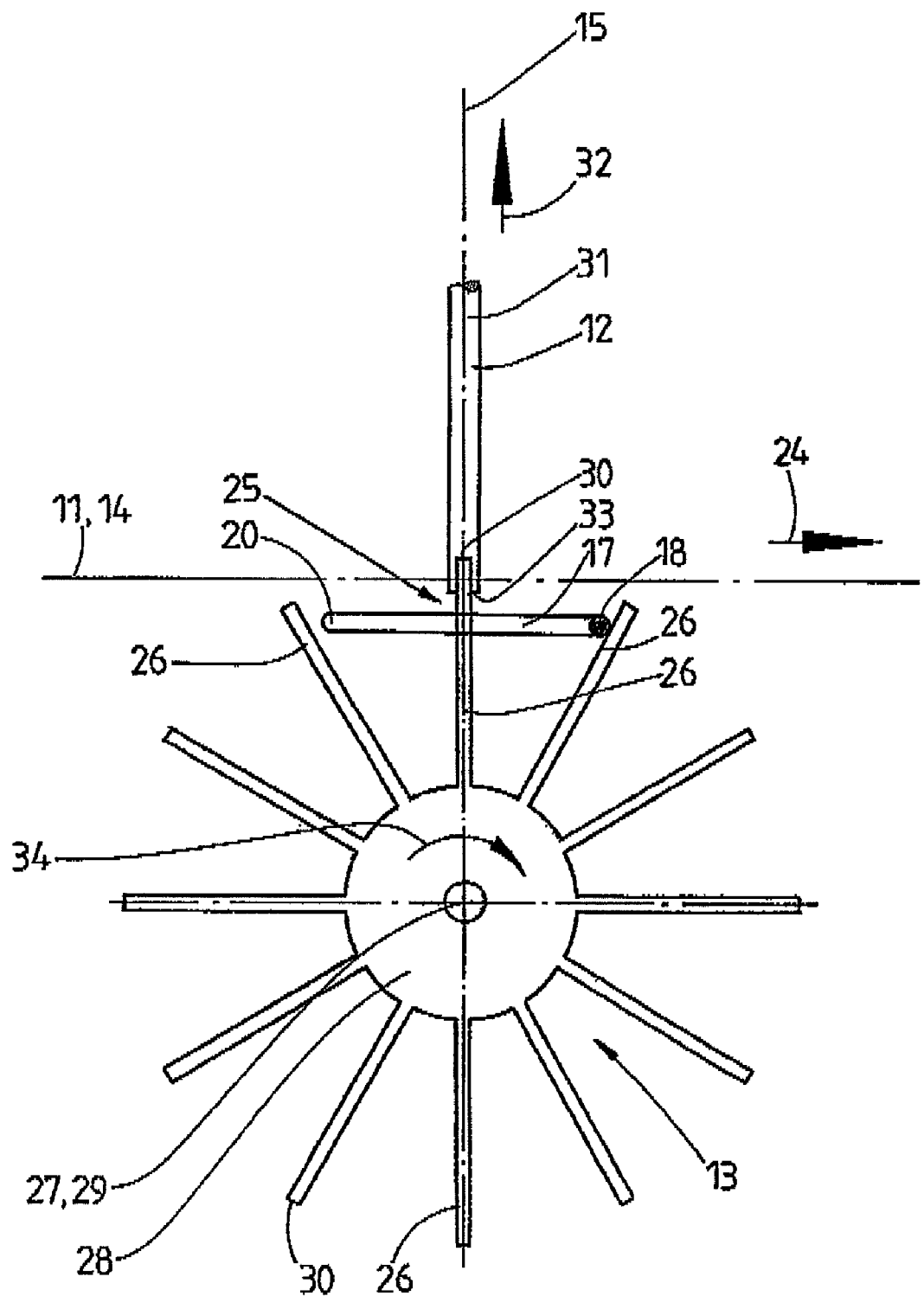
FIG. 6 shows a plan view of the device of FIGS. 4 and 5 with the transporting hanger being located in the transfer position.

The method according to the invention proceeds as follows:

FIGS. 4 to 6 explain the method for the case in which the transporting hanger 10 hanging on the delivery conveyor 11 is oriented with the stem 18 of the hanger hook 16 out in front in the conveying direction 24. In FIGS. 4 to 8, this stem 18 is symbolized by a black circle for purposes of illustration. In FIGS. 4 to 8, the conveying section 14 of the feed conveyor 11 is merely indicated by a dot-dashed line. The pin 22 on the conveying chain 21, on which the hook 11 of the transporting hanger 10 hangs, is not represented in FIGS. 4 to 8. Of the delivery conveyor 12, only an end region extending from the free end 33 is depicted in FIGS. 4 to 8.

In FIG. 4 it is shown that, during the conveying of the transporting hanger 10 by the feed conveyor 11 in the conveying direction 24, the out-in-front stem 18 of the hanger hook 16 comes into contact with the front of an arm 26 of the turnstile-like intermediate conveyor 13. In the conveying direction 24 of the feed conveyor 11, this arm 26 is located by one division between two arms 26 ahead of that preceding arm 26 that is momentarily acting as an extension of the conveying section 15 of the delivery conveyor 12, that is to say lies on a common line with the latter.

During the further transport of the transporting hanger 10 by the feed conveyor 11 in the conveying direction 24, the stem 18 of the transporting hanger 10 pushes ahead of it the arm 26 with the front of which it is in contact. In this case, the stem 18 of the transporting hanger 10 causes a turning of the entire intermediate conveyor 13 in the clockwise direction, that is to say in the direction of rotation 34.

FIG. 5 shows the intermediate conveyor 13 in a state in which it has been turned further by the division of the arms 26, that is to say in the exemplary embodiment shown approximately 30°, in the direction of rotation 34 about the vertical axis of rotation 29. In this case, the arm 26 with which the stem 18 is in contact comes into line with the longitudinal axis of the conveying section 15 of the delivery conveyor 12, that is to say acts as an extension of it. During the further movement of the intermediate conveyor 13 by 30° (compare FIGS. 4 and 5), the arm 26 that is following the arm 26 with which the stem 18 is in contact, seen in the direction of rotation 34, ends up under the arcuate hook 17 of the transporting hanger 10. In this case, the arm 26 crosses the vertical plane of the hanger hook 16 (FIG. 5). As a result, the free end 30 of the arm 26 is located on the rear side of the hanger hook 16, facing the conveying section 14 of the feed conveyor 11.

In the further conveying of the transporting hanger 10 on the conveying section 14 of the feed conveyor 11 in the conveying direction 24, the turnstile-like intermediate conveyor 13 is once again turned further by one division of the arms 26, that is to say in the exemplary embodiment shown approximately 30°, in the direction of rotation 34, in that the stem 18 of the transporting hanger 10 further pushes ahead of it the arm 26 with which it is in contact. In this case, the next-following arm 26, inserted into the plane of the hanger hook 16, comes into line with the delivery conveyor 12, in that specifically the longitudinal axis of the arm 26 lies on the longitudinal axis of the delivery conveyor 12 and it consequently acts as an extension of the delivery conveyor 12 beyond the free end 33 of the rail 31 of the latter, counter to its conveying direction 32. Here, a free end region of the arm 26 overlaps a free end region of the rail 31 of the delivery conveyor 12, the free end region of the arm 26 being located approximately over the end region of the rail 31 of the delivery conveyor 12. As a result, the arm 26 can extend away over the free end region of the delivery conveyor 12. Here, the arm 26 acting as an extension of the delivery conveyor 12 is located approximately centrally under the hook 17 of the transporting hanger 10, the arm 26 intersecting the vertical plane of the hanger hook 16 of the transporting hanger 10 approximately at right angles (FIG. 6).

When the transporting hanger 10 and the turnstile-like intermediate conveyor 13 have reached the position shown in FIG. 6, the transporting hanger 10, specifically its hanger hook 16, is released from the feed conveyor 11, for example by withdrawing the pin 22 holding the transporting hanger 10 on the conveying chain 21 of the feed conveyor 11. The transporting hanger 10 with the hanger hook 16 then falls approximately down onto the arm 26 of the intermediate conveyor 13 that is located centrally under the hook 17 of the transporting hanger 10. As a result of the inclined path of the arm 26 (and also of the other arms 26 of the intermediate conveyor 13) toward the delivery conveyor 12, the hook 17 slides down off the arm 26 in the direction of its free end 30. As a result of the overlapping of the end region of the arm 26 with the end region of the rail 31 of the delivery conveyor 12 pointing toward the arm 26, the transporting hanger 10 slides with the hook 17 onto the free end region of the rail 31 lying under the free end 30 of the arm 26. Because, in the exemplary embodiment shown, the rail 31 of the delivery conveyor 12 is also inclined, the transporting hanger 10 being transferred from the intermediate conveyor 13 to the delivery conveyor 12 then slides with its hook 17 along the delivery conveyor 12 in the conveying direction 32 to the following processing station, a store or the like.

Figure 7:
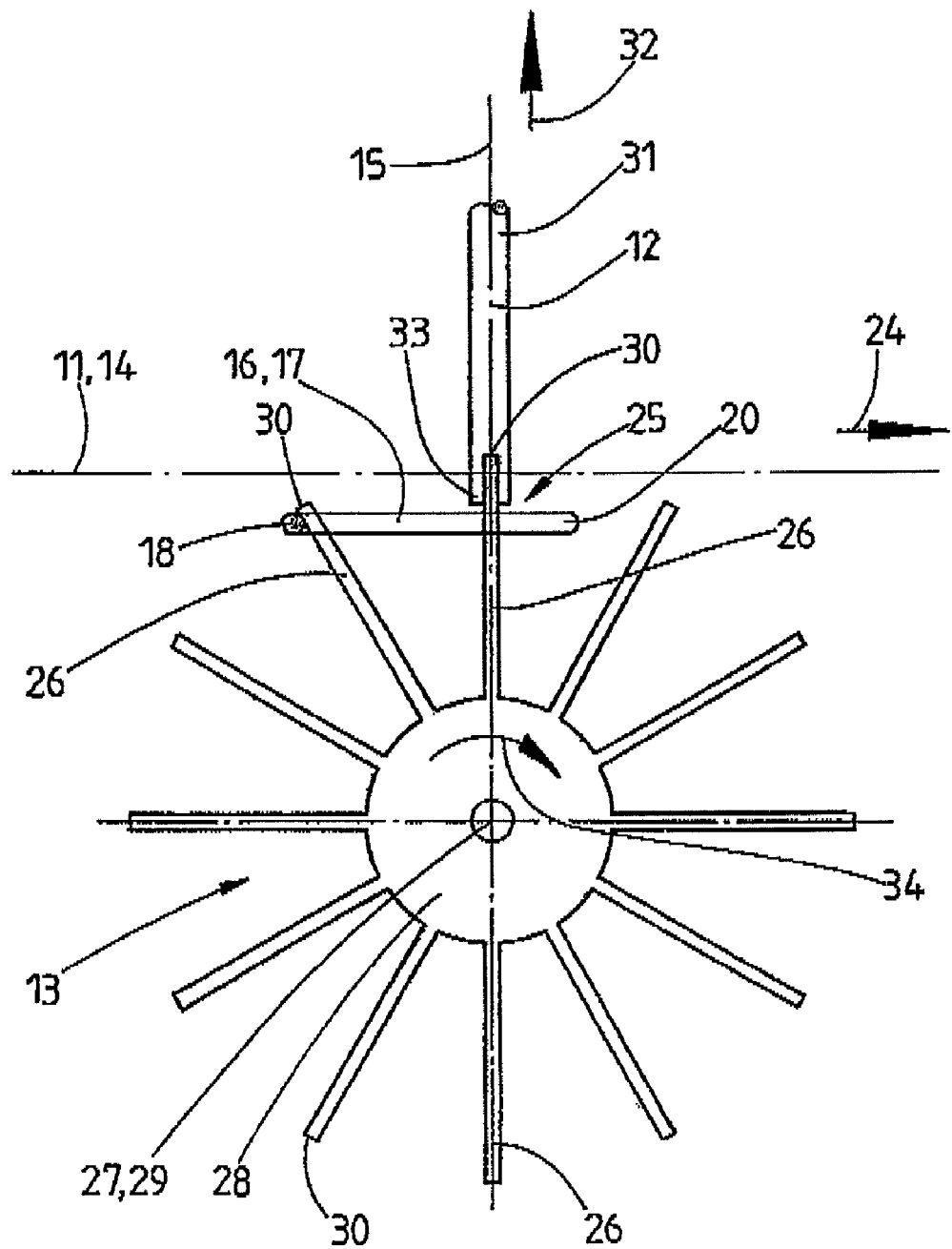
FIG. 7 shows a plan view of the device for transferring a transporting hanger with the stem on the hanger hook trailing behind.
Figure 8:
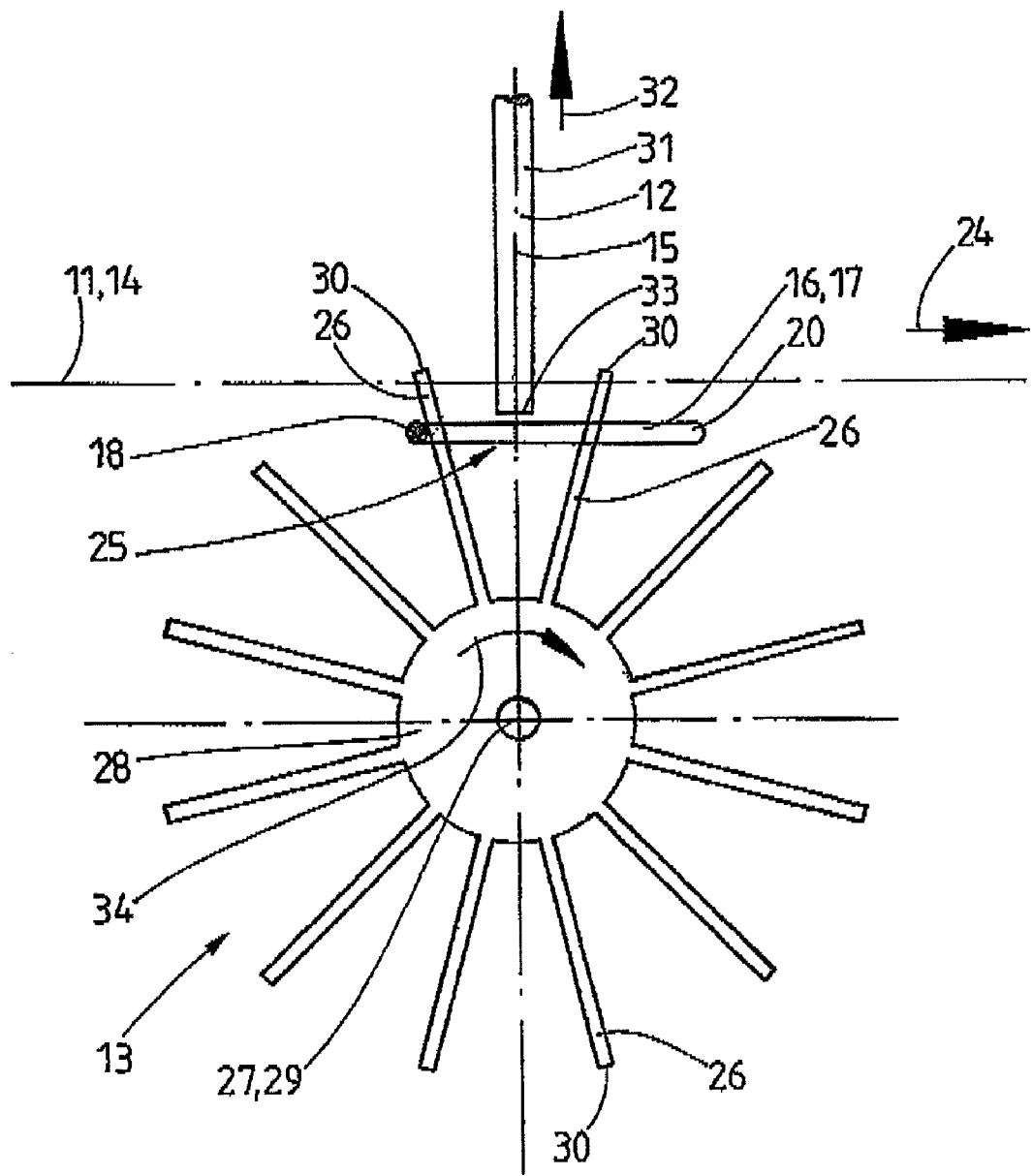
FIG. 8 shows the device of FIG. 7 with the transporting hanger being located in the transfer position.

FIGS. 7 and 8 schematically show the transfer of a transporting hanger 10 from the feed conveyor 11 to the delivery conveyor 12 with an opposite orientation of the transporting hanger 10 hanging on the delivery chain 21 of the feed conveyor 11. Here, the stem 18 of the hanger hook 16 trails in the conveying direction 24 of the feed conveyor 11. That is to say that the bent hook 17 of the hanger hook 16 is located in front of the perpendicular stem 18 of the hanger hook 16, as seen in the conveying direction 24. Accordingly, during the further transport of the transporting hanger 10 by the feed conveyor 11 along its conveying section 14 in the conveying direction 24, the hook 17 can pass over two successive arms 26 of the intermediate conveyor 13 before the perpendicular stem 18 impinges behind an arm 26. This situation is shown in FIG. 7. In the present case of the trailing stem 18, no insertion of an arm 26 following the arm 26 that is being pushed ahead into the plane of the hanger hook 16 is necessary. Because of the trailing stem 18, the hook 17 passes directly over two successive arms 26. These arms 26 thereby intersect the plane of the hanger hook 16 at different angles (FIG. 7).

In principle, the transporting hanger 10 could be released from the feed conveyor 11 already in the position of the intermediate conveyor 13 that is shown in FIG. 7, because an arm 26 is already acting as an extension of the conveying section 15 of the delivery conveyor 12 and, when the transporting hanger 10 is released from the intermediate conveyor 13, the hanger hook 16 ends up on this arm and possibly the following arm 26, with which the stem 18 of the hanger hook 16 is in contact. The hanger hook 16 can then be caught by both arms 26 and, by slipping off the arms 26, in particular the arm 26 that is momentarily acting as an extension of the conveying section 15 of the delivery conveyor 12, end up on the end region of the rail 31 of the delivery conveyor 12 that is overlapping this arm 26.

With preference, the transporting hanger 10 impinging on an arm 26 with the trailing stem 18 is transported further by the feed conveyor 11 a little more along the conveying section 14, and the turnstile of the intermediate conveyor 13 is thereby moved further in the direction of rotation 34, to be precise preferably only by half a division between two arms 26, that is to say approximately 15°. Then the end region of the conveying section 15 of the delivery conveyor 12 that protrudes into the circular path of the free ends 30 of the arms 26 is located approximately midway between two adjacent arms 26 (FIG. 8). If the transporting hanger 10 is then decoupled from the pin 22 previously carrying it on the conveying chain 21 of the feed conveyor 11, the transporting hanger 10 falls with the hook 17 onto the two adjacent arms 26, whereby the hook 17 is positioned centrally in front of the conveying section 15 of the delivery conveyor 12. By sliding off both arms 26, the hook 17 of the transporting hanger 10 passes over the free end 30 of the rail 31 of the delivery conveyor 12 that is lying under the arms 26, whereby a reliable transfer of the transporting hanger 10 to the delivery conveyor 12 is ensured. The two successive arms 26 need not have a relative position with respect to the end region of the rail 31 of the delivery conveyor 12 such that this end region lies midway between the arms 26, as represented in an idealized form in FIG. 8; it is also sufficient if the end region of the rail 31 is located somewhere between the arms 26.

The invention can be implemented with transporting hangers of any configuration, including those with at least one clip, for example for pants.

LIST OF DESIGNATIONS 10 transporting hanger
11 feed conveyor
12 delivery conveyor
13 intermediate conveyor
14 conveying section
15 conveying section
16 hanger hook
17 hook
18 stem
19 lower part
20 free end
21 conveying chain
22 pin
23 free end
24 conveying direction
25 transfer point
26 arm
27 center point
28 central part
29 axis of rotation
30 free end
31 rail
32 conveying direction
33 free end
34 rotating direction

What is claimed is:

1. A method for transferring a transporting hanger (10) for garments from a feed conveyor (11) to a following delivery conveyor, the transporting hanger (10) hanging by a hanger hook (16) on the feed conveyor (11) being released from the feed conveyor (11) and, for further transport, the transporting hanger (10) being hung onto the following conveyor, wherein, when the transporting hanger (10) is released from the feed conveyor (11), the hook (16) of the transporting hanger (10) is caught by at least one short intermediate conveying section of the intermediate conveyor (13) and the transporting hanger (10) is transferred by the at least one intermediate conveyor (13) to the following conveyor, with the at least one intermediate conveying section being moved by the transporting hanger (10) into a position for catching the hook (16) before the transporting hanger (10) is released from the feed conveyor (11).

2. The method as claimed in claim 1, wherein the at least one intermediate conveying section comprises a longitudinal axis and is moved into the position for catching the hanger hook (16) by pivoting about one end, wherein the at least one intermediate conveying section is pivoted transversely relative to the longitudinal axis of the at least one intermediate conveying section by turning about an axis of rotation (29).

3. The method as claimed in claim 2, wherein a free end (30) of the at least one intermediate conveying section remote from the axis of rotation (29) is moved during the pivoting of the at least one intermediate conveying section on a circular path about the axis of rotation (29) and this circular path intersects a conveying section (14) of the feed conveyor (11), the transporting hanger (10) being released from the feed conveyor (11) onto the at least one intermediate conveying section of the at least one intermediate conveyor (13) after the hanger hook (16) of the transporting hanger (10) enters the circular path of the free ends (30) of the at least one intermediate conveying section.

4. The method as claimed in claim 3, wherein each of the at least one intermediate conveying section of the at least one intermediate conveyor (13) slopes down toward the free end (30) for the hanger hook (16) of the transporting hanger (10) to slide along the at least one intermediate conveying section and over the free end (30) of the at least one intermediate conveying section.

5. The method as claimed in claim 4, wherein, by sliding over the free end (30) of the at least one intermediate conveying section, the hanger hook (16) of the transporting hanger (10) is transferred to the conveying section (15) of the following conveyor by the hanger hook (16) of the transporting hanger (10) that slides off from the at least one intermediate conveying section sliding onto the conveying section (15) of the following conveyor that is correspondingly made to slope downward in a conveying direction (32).

6. The method as claimed in claim 3, wherein the at least one intermediate conveying section serving for transferring the transporting hanger (10) to a conveying section (15) of a following conveyor is momentarily arranged in front of the conveying section (15) of a following conveyor during the transfer to the following conveyor of the conveying section (15) of a following conveyor.

7. The method as claimed in claim 6, wherein the transporting hanger (10) is transferred to the following conveyor approximately in the position in which the at least one intermediate conveying section receives the transporting hanger (10) from the feed conveyor (11).

8. A device for transferring a transporting hanger (10) for garments from a feed conveyor (11) to a following delivery conveyor (12), comprising an intermediate conveyor (13) arranged between the feed conveyor (11) and the following delivery conveyor, wherein:
the intermediate conveyor (13) has a plurality of intermediate conveying sections that can be moved in common,
the intermediate conveying sections of the intermediate conveyor (13) are formed by elongate arms (26) oriented in a star-like or spider-like manner in that, proceeding from a center point (27) of the intermediate conveyor (13) lying on an axis of rotation (29), all of the arms (26) of the intermediate conveying sections extend outwards in a radial manner, and
the intermediate conveyor (13) with the arms (26) is not driven and freely rotatable about the axis of rotation (29).

9. The device as claimed in claim 8, wherein the intermediate conveying sections are assigned to the conveying section (14) of the feed conveyor (11) in such a way that at least one intermediate conveying section intersects the conveying section (14) of the feed conveyor (11) for the takeover of a hanger hook (16) of the transporting hanger (10).

10. The device as claimed in claim 9, wherein, for the transfer of the transporting hanger (10) from the intermediate conveyor (13) to the following delivery conveyor, the conveying section (15) of the following delivery conveyor acts as an extension of the at least one intermediate conveying section, an end region of the respective intermediate conveying section overlapping somewhat a beginning region of the conveying section (15) of the following delivery conveyor, with an end region of the at least one intermediate conveying section extending above the beginning region of the conveying section (15) of the following delivery conveyor (12).

11. The device as claimed in claim 10, wherein the following delivery conveyor has a rail (31) for the transporting hanger (10) to slide along, and located over a beginning region of the rail (31) there is an end region of the at least one arm (26) to which the transporting hanger (10) has been transferred from the feed conveyor (11).

12. The device as claimed in claim 8, wherein all the arms (26) are connected at one end to the center point (27) of the intermediate conveyor (13).

13. The device as claimed in claim 12, wherein free ends (30) of all the arms (26), the arms (26) being rod-like and which form the intermediate conveying sections of the intermediate conveyor (13), lie on an imaginary circular path, which extends concentrically around the center point (27) of the intermediate conveyor (13).

14. The device as claimed in claim 8, wherein the intermediate conveyor (13) is a turnstile or turret having an axis of rotation (29) lying at the center point (27) of the intermediate conveyor (30), about which all the arms (26) move in a rotating manner, the arms (26) extending in an inclined manner from the center point (27) of the intermediate conveyor (13), in that the arms (26) slope down toward their free ends (30) and/or the axis of rotation (29) of the intermediate conveyor (13) extends in an upright or slightly inclined manner.

15. The device as claimed in claim 14, wherein, to form the intermediate conveyor (13), the turnstile or turret is assigned to the feed conveyor (11) in such a way that, during the further transport along the conveying section (14) of the feed conveyor (11), a vertical stem (18) portion of the hanger hook (16) ends up between two adjacent arms (26) of the intermediate conveyor (13) and the arms (26) of the intermediate conveyor (13) thereby turn about the axis of rotation (29) when one arm (26) intersects the conveying section (14) of the feed conveyor (11), at approximately a right angle, and the at least one arm (26) is located under the hanger hook (16), and the at least one arm (26) to which the transporting hanger (10) is transferred from the feed conveyor (11) is assigned to the following conveyor.

* * * * *